March 21, 1967 C. R. ATZENBECK 3,310,751

SIGNAL DISTORTION CORRECTION CIRCUIT EMPLOYING MEANS FOR STORING SIGNAL SAMPLES AND INITIATING CORRECTION WHEN THE PATTERN OF STORED SAMPLES INDICATES THE PRESENCE OF DISTORTION

Filed April 30, 1963

INVENTOR.
CHARLES R. ATZENBECK
BY
Edward J. Norton
Attorney 3,310,751

SIGNAL DISTORTION CORRECTION CIRCUIT EMPLOYING MEANS FOR STORING SIGNAL SAMPLES AND INITIATING CORRECTION WHEN THE PATTERN OF STORED SAMPLES INDICATES THE PRESENCE OF DISTORTION

Charles R. Atzenbeck, Cranford, N.J., assignor to Radio Corporation of America, a corporation of Delaware Filed Apr. 30, 1963, Ser. No. 276,705
15 Claims. (Cl. 328—163)

Figure 1:
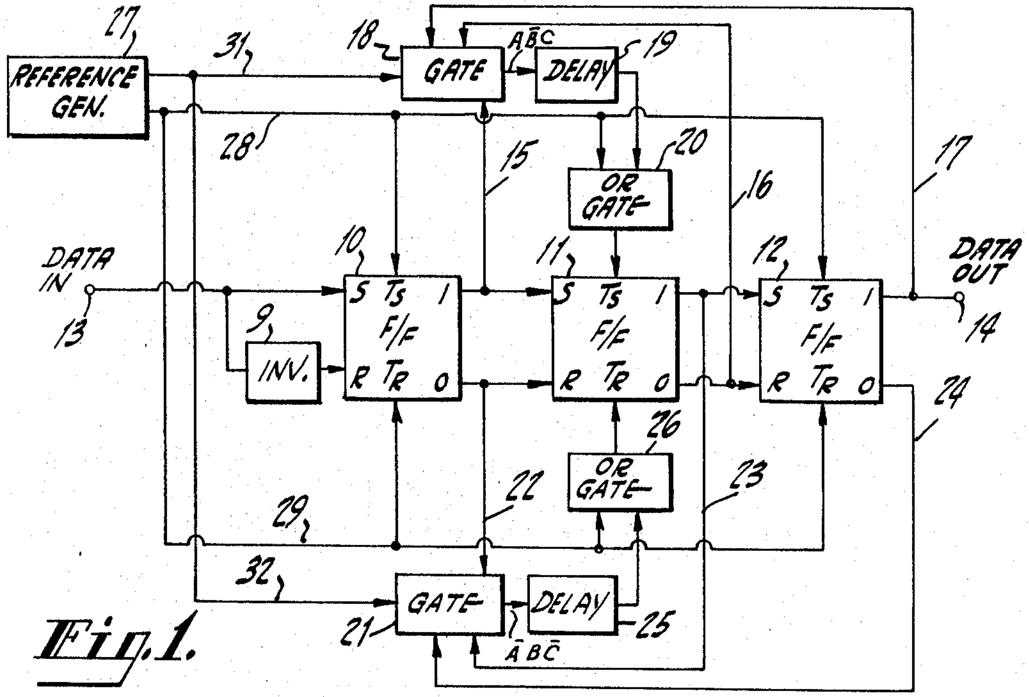

This invention relates to improved distortion detection and correction circuits for data signals and, particularly, to an improved circuit in which digital techniques are used to detect and correct objectionable transient changes in the level of a data signal.

In the transmission of information by means of a data signal, the data signal is typically divided into time periods or bit intervals. The signal remains at one level for the duration of a bit interval to indicate a first signal condition with the signal remaining at a second level for the duration of a bit interval to indicate a second signal condition. The first signal condition is usually defined as mark or "1," while the second signal condition is defined as space or "0." The signal is shifted between the two levels in succeeding bit intervals according to the information to be transmitted. A data signal of this type is referred to as an NRZ (non-return-to-zero) data signal.

In producing and processing a data signal of the type described, objectionable interference or distortion is introduced in the signal in the form of transient changes in the level of the signal during the bit intervals. The signal level shifts momentarily during a bit interval from the existing level to the other or second level and back to the original level, resulting in the introduction of a break or discontinuity in the bit interval. Such transient changes in the level of the signal, referred to as hits, occur in an irregular fashion and are of varying duration. The hits may be produced by relay bounce, poor switching operation, off-timing conditions and other noise sources in the signal processing equipments. In certain applications, the hits can be produced by the data processing equipment or modem responding to a signal error or other irregularity in the data signal itself. While such hits are for the most part of relatively short duration compared to the length of the bit interval in which they occur, the presence of the hits in the data signal prevents the proper operation of equipment designed to recover the information from the signal by recognizing the signal level during the succeeding bit intervals.

Efforts to remove the hits or transient changes from data signals have typically involved the use of an analogue low pass filter which tends to smooth out the signal. The filtered signal is then fed through a slicer designed to clip both sides of the signal at a given level, producing a squared wave substantially free of the hits or similar discontinuities. This approach requires rigorous filter design with the design problems and complexities becoming increasingly severe as provision is made for higher speeds or rates of data transmission.

It is an object of the invention to provide an improved circuit arrangement for detecting and correcting distortion in a data signal.

A further object it to provide an improved circuit arrangement using digital techniques to detect and remove interference from a data signal where the interference is in the form of transient changes in the level of the signal.

A still further object is to provide an improved digital filter for removing objectionable transient changes in the level of a data signal.

Another object is to provide an improved signal distortion detecting and correcting circuit using digital techniques.

Briefly, in the embodiment of the invention described herein, a data signal including interference in the form of an undesirable transient change in the signal level within one or more bit intervals is sampled at a rate determined by the duration of the interference and the data speed or frequency. The samples of the data signal are stored. By way of example, a shift register can be used to perform both the sampling and storage function. The samples are then examined by means of a gate or similar circuit for a given pattern which indicates that the interference has occurred. The output of the gate circuit when the pattern indicates that the interference has occurred is applied to the shift register or other storage means in a manner to remove the erroneous pattern and thereby remove the interference from the data signal. The data signal appears at the output of the storage means free of the interference.

A distortion detecting and correcting circuit for data signals is provided by the invention in the form of a filter using only digital techniques. The correction of the data signal is performed with a minimum of component parts and complexity, completely avoiding the filter design and other problems encountered in the analogue techniques previously employed to obtain a similar result.

Figure 2:
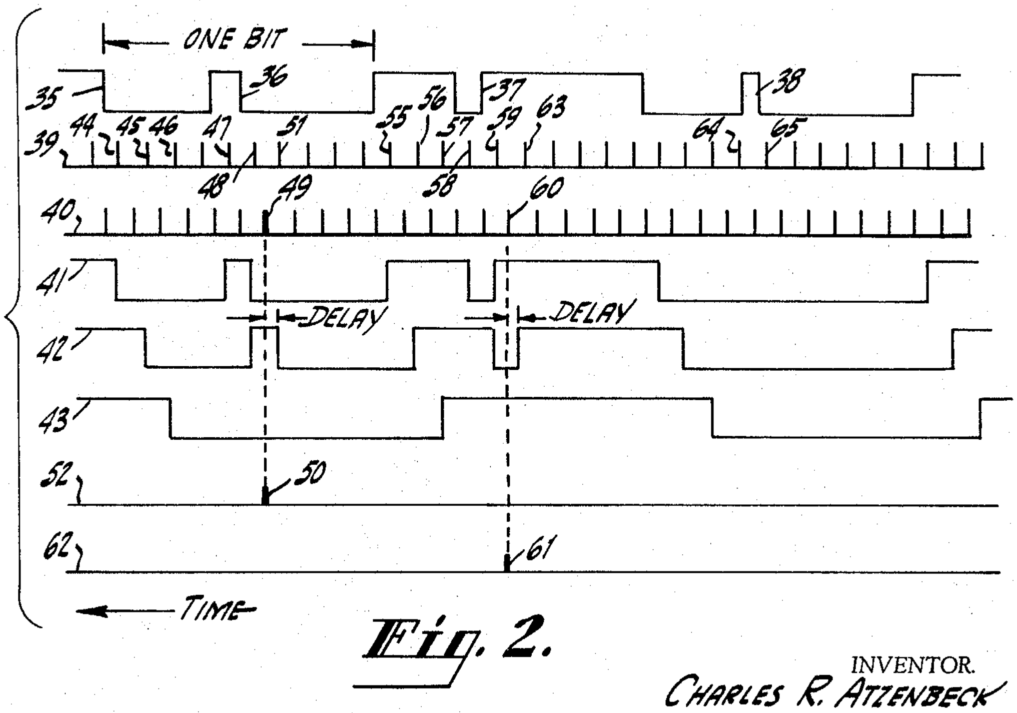

A more detailed description of the invention will now be given in connection with the accompanying drawing, in which:

FIG. 1 is a block diagram of one embodiment of a signal distortion detecting and correcting circuit constructed according to the invention, and FIG. 2 is a series of waveforms useful in describing the operation of the embodiment shown in FIG. 1, All ground symbols and common return paths are omitted in the block diagram of FIG. 1 in order to simplify the drawing. Such connections would be provided in the customary manner.

A shift register including three steerable flip-flop stages 10, 11 and 12 is shown in FIG. 1. The flip-flops 10, 11 and 12 may be of any known construction and are defined as a circuit having two stable states or conditions, set and reset respectively. Two input terminals are provided for the circuit, one of which is designated as set S, the other reset R. Two outputs are associated with the flip-flop circuit which are given the Boolean tags of One and Zero. If the flip-flop is in its set condition, the One output terminal voltage is high and the Zero output terminal voltage is low. If the flip-flop is in its reset condition, the One output terminal voltage is low and the Zero output terminal voltage is high. The three flop-flops 10, 11 and 12 are all of similar construction with each flip-flop operating in the manner described.

A trigger pulse applied simutaneously to the trigger inputs of the set and reset input sides of the flip-flop, $T_S$ and $T_R$, respectively, causes the flip-flop to assume its set condition if the set input terminal S voltage is high and the reset input terminal R voltage is low at the time of the trigger pulse, and causes the flip-flop to assume its reset condition when the reset input terminal R voltage is high and the set input terminal S voltage is low at the time of the trigger pulse. By way of example, the flip-flops 10, 11 and 12 may be constructed in the manner shown on page 160, General Electric Transistor Manual, 6th edition, published by the General Electric Company.

A data signal is applied via an input terminal 13 to the set input terminal S of the first flip-flop 10 and through an inverter 9 to the reset input terminal R of the first flip-flop 10. The One output terminal of the first flip-flop 10 is connected to the set input terminal S of the second flip-flop 11 with the Zero output terminal of the first flip-flop 10 being connected to the reset input terminal R of the second flip-flop 11. Similarly, the One output terminal of the second flip-flop 11 is connected to the set input terminal S of the third flip-flop 12, the Zero output terminal of the second flip-flop 11 being connected to the reset input terminal R of the third flip-flop 12. The One output terminal of the third flip-flop 12 is connected to an output terminal 14.

The One output terminal of the first flip-flop 10, the Zero output terminal of the second flip-flop 11, and the One output terminal of the third flip-flop 12 are connected over leads 15, 16 and 17, respectively, to a gate circuit 18. The gate circuit 18 may be a simple arrangement of unidirectional current conducting devices, for example, crystal diodes, poled so that an output pulse is produced by the gate circuit 18 when and only when a given pattern or arrangement of voltage levels appears at the respective inputs to the gate circuit 18. The output of the gate circuit 18 is connected through a delay 19 to an OR gate circuit 20. The output of the OR gate circuit 20 is connected to the trigger input terminal $T_S$ on the set input side of the second flip-flop 11.

The Zero output terminal of the first flip-flop 10, the One output terminal of the second flip-flop 11, and the Zero output terminal of the third flip-flop 12 are connected to a further gate circuit 21 via leads 22, 23 and 24, respectively. The gate circuit 21 which also may be of a simple construction using unidirectional current conducting devices in the manner of the gate circuit 18 is arranged to produce an output pulse only when a given pattern or arrangement of voltage levels exists on the respective inputs thereto. The output of the gate circuit 21 is connected through a delay 25 to an OR gate circuit 26. The output of the OR gate 26 is connected to the trigger input terminal $T_R$ on the reset input side of the second flip-flop 11. Designating the bits stored by flip-flops 10, 11, and 12 as A, B, and C respectively, the output of gate 18 may be represented by the logic designation $A\ \overline{B}\ C$, and that of gate 21 as $\overline{A}\ B\ \overline{C}$.

A reference generator 27 is provided for supplying a first train of regularly recurring sampling pulses. This pulse train is applied from the reference generator 27 to the trigger input terminal $T_S$ on the set input side of the first flip-flop 10, to the OR gate 20, and to the trigger input terminal $T_S$ on the set input side of the third flip-flop 12 over lead 28. The pulse train is also applied from the reference generator 27 to the trigger input terminal $T_R$ on the reset input side of the first flip-flop 10, to the OR gate 26, and to the trigger input terminal $T_R$ on the reset input side of the third flip-flop 12 over lead 29. The reference generator 27 also supplies a second pulse train of the same frequency as the first-mentioned pulse train but with the pulses in the second pulse train occurring in time midway between the pulses in the first pulse train. The second pulse train is fed from the reference generator 27 to an input of the gate circuit 18 over a lead 31 and to an input of the gate circuit 21 over lead 32.

In describing the operation of the embodiment of the invention shown in the block diagram of FIG. 1, reference will be made to the waveforms shown in FIG. 2. A typical data signal is shown in the first waveform 35 of FIG. 2. The data signal is shown as shifting from a low level during a first bit interval to a high level during a second bit interval and back to the low level during a third bit interval. A hit or transient change 36 in the signal level is shown as occurring during the first bit interval with a hit or transient change 37 in the signal level occurring during the second bit interval. A hit 38 is also shown during the third bit interval. As indicated, the hits 36, 37 and 38 represent a momentary break or discontinuity in the level of the signal during the respective bit intervals. The hits occur at irregular times and are of different widths with the actual time of occurrence of each hit being unpredictable. The data signal 35 is applied from the input terminal 13 to the set input terminal S and through the inverter 9 to the reset input terminal R of the first flip-flop 10.

It will be assumed that the data signal 35 has a bit rate of 1000 bits per second. It will also be assumed that the hits 36, 37 and 38 to be removed are of 0.1 millisecond duration and less. Reference generator 27 is designed to provide a first pulse train 39 shown in FIG. 2 over leads 28 and 29 to the trigger inputs $T_S$ and $T_R$ of the first and third flip-flops 10, 12 and to the OR gates 20, 26 in the manner described. The pulse train 39 is, by way of example, made to have a frequency slightly less than 10,000 cycles per second, resulting in the appearance of approximately ten sample pulses in the pulse train 39 during each bit interval of the data signal 35. The reference generator 27 also supplies a second pulse train shown in waveform 40 of FIG. 2 to the gate circuits 18 and 21 over leads 31 and 32, respectively. The second pulse train 40 is of the same frequency as the first pulse train 39 but differs in phase so that each pulse of the second pulse train occurs in time midway between adjacent pulses in the first pulse train 39.

The output voltage appearing at the One output terminal of the first flip-flop 10 is shown in waveform 41 of FIG. 2. Waveform 42 represents the output voltage level at the One output terminal of the second flip-flop 11, and waveform 43 represents the output voltage level at the One output terminal of the third flip-flop 12. The flip-flop stages 10, 11 and 12 are assumed to all be at first in their set conditions, resulting in the One output terminals of the flip-flop stages all being high and the Zero output terminals all being low.

Upon the sampling pulse 44 in the pulse train 39 being applied to the trigger inputs $T_S$ and $T_R$ of the first flip-flop 10, the flip-flop 10 assumes its reset condition. This is true since the data input signal 35 appplied to the flip-flop 10 from input terminal 13 is at this time low at the set input terminal S and high at the reset input terminal R. The One output terminal of the flip-flop 10 becomes low as shown in waveform 41, and the Zero output terminal becomes high. Upon the application of the next sampling pulse 45 of the pulse train 39 to the trigger input terminals $T_S$ and $T_R$ of the first flip-flop 10, the flip-flop 10 remains in its reset condition since the data input signal 35 remains at its low level. The application of the sampling pulse 45 to the trigger input terminal $T_S$ of the second flip-flop 11 through the OR gate 20 and to the trigger input terminal $T_R$ of the flip-flop 11 through the OR gate 26 results in the flip-flop 11 assuming its reset condition. The second flip-flop 11 then changes condition to the reset state, because at the time of the sampling pulse 45 the voltage level at the set input terminal S of the second flip-flop 11 is low and the voltage level at the reset input terminal R of the flip-flop 11 is high due to the status of the first flip-flop 10 in its reset condition. The voltage level at the set input terminal S of the third flip-flop 12 from the One output terminal of the second flip-flop 11 becomes low, and the voltage level at the reset input terminal R of the third flip-flop 12 from the Zero output terminal of the second flip-flop 11 becomes high.

Upon the occurrence of the next sampling pulse 46 in the pulse train 39, the first flip-flop 10 remains in its reset condition since no change in the level of the data input signal 35 has occurred. The voltage level at the reset input terminal R of the second flip-flop 11 continues to be high, and the second flip-flop 11 remains in its reset condition. The sampling pulse 46 applied to the trigger input terminals $T_S$ and $T_R$ of the third flip-flop 12 causes the flip-flop 12 to assume its reset condition, reflecting the status of the second flip-flop 11 in its reset condition. The signal level at the output terminal 14 shifts from the high to the low level in a manner corresponding to the change in the voltage level at the One output terminal of the third flip-flop 12 and to the change in the level of the data input signal 35.

The three flip-flops 10, 11 and 12 thereafter all remain in their reset conditions so long as the data input signal 35 remains at its low level. Upon the occurrence of the leading edge of the hit 36, the set input terminal S of the first flip-flop 10 becomes high, and the reset input terminal R of the flip-flop 10 becomes low as a result of the change in the level of the data input signal 35. The appearance of the next sampling pulse 47 in the pulse train 39 following the change in the level of the data input signal 35 triggers the first flip-flop 10 into its set condition. The One output terminal of flip-flop 10 goes high as shown in waveform 41. The second and third flip-flops 11, 12 remain in their reset conditions at the time of the sampling pulse 47, reflecting the voltage levels existing at their set and reset inputs at the time of the pulse 47. When the next sampling pulse 48 occurs in the pulse train 39, the data input signal 35 is again at its low level, the hit 36 occurring during the first bit interval having terminated prior to the occurrence of the sampling pulse 48. Since the reset input terminal R of the first flip-flop 10 is now high, the flip-flop 10 is triggered by the sampling pulse 48 into its reset condition. The One output terminal of the flip-flop 10 goes low as shown in waveform 41.

In the operation of the flip-flop 10, as well as in the operation of the other flip-flops 11 and 12, a delay is provided before a change in the condition of the inputs to the set and reset terminals of the flip-flop will effect the response by the flip-flop to a pulse applied to the trigger inputs $T_S$ and $T_R$, respectively. This delay is customarily provided by a diode-capacitance-resistance network in the input circuits of the flip-flop and is usually termed a CRD type gate. The delay is sufficient to cause a change of voltage levels at the input terminals S and R to have no effect until after the termination of the trigger pulse causing a change in the condition of the previous flip-flop. Since the first flip-flop 10 is in its set condition at the time of the sampling pulse 48, the set input terminal S of the second flip-flop 11 is high. Because of the delay, the set input side of the flip-flop 11 remains high for the duration of the sampling pulse 48. The application of the sampling pulse 48 to the trigger input terminals $T_S$ and $T_R$ of the second flip-flop 11 triggers the flip-flop 11 from its reset to its set condition. The level at the One output terminal of flip-flop 11 goes high as may be seen in waveform 42.

At the time of the next pulse 49 in the second pulse train 40 following the sampling pulse 48 in the first pulse train 39, the flip-flop 10 is in its reset condition and the input to the gate 21 from the Zero output terminal of the flip-flop 10 is high. The second flip-flop 11 is in its set condition, and the input to the gate circuit 21 from the One output terminal of the flip-flop 11 is high. The third flip-flop 12 is in its reset condition, and the input to the gate circuit 21 from the Zero output terminal of the third flip-flop 12 is high. All four inputs to the gate circuit 21 are high. The gate circuit 21 is designed to "recognize" at the time of a pulse in the pulse train 40 applied thereto from the reference generator 27 only this pattern or arrangement of the respective inputs. The application of the pulse 49 to the gate circuit 21 from the reference generator 27 results in the production of a pulse 50, waveform 52, at the output of the gate circuit 21.

The pulse 50 produced by the gate circuit 21 is delayed for a short interval by the delay 25 and applied to the trigger input terminal $T_R$ of the second flip-flop 11. The reset input terminal R of the flip-flop 11 is high at this time due to the previous change in state of the first flip-flop 10 from a set to reset condition at the time of the sampling pulse 48. The application of the pulse 50 to the second flip-flop 11, therefore, triggers the flip-flop 11 into its reset condition. As shown in waveform 42, the level at the One output terminal of the flip-flop 11 becomes low.

The delay 25 serves to avoid "race" problems in the operation of the flip-flop 11. The delay which need not be longer than the width of the pulse 49 permits the pulse 50 to build up to a sufficient level to ensure the triggering of the flip-flop 11 from its set to reset condition. Since the flip-flop 11 controls the production of the pulse 50, a fast response on the part of the flip-flop 11 can tend to inhibit the production of the pulse 50 by the gate circuit 21, cutting off the pulse 50 before the triggering action is completed. By delaying the pulse 50 for a period sufficient to permit a full trigger pulse to be formed, the flip-flop 11 change in condition cannot abbreviate or cut off the pulse 50 when produced by the gate circuit 21, and the completion of the change in condition of the flip-flop 11 is assured.

When the next sampling pulse 51 in the pulse train 39, occurs, the first flip-flop 10 remains in its reset condition since the data input signal continues at the low level. The second flip-flop 11 having been reset by the trigger pulse 50 produced by the gate circuit 21, also remains in its reset condition. The reset input terminal R of the third flip-flop 12 is high at the time of the sampling pulse 51, and the third flip-flop 12 remains in its reset condition. As shown in waveform 43, the One output terminal of the flip-flop 12 continues at the low level unaffected by the presence of the hit 36 in the data input signal 35. The hit 36 having been detected is completely removed from the data output signal appearing at the output terminal 14.

Sampling pulse 55, occurring in the pulse train 39 after the transition in the data input signal 35 from a low level to the high level to begin the second bit interval, triggers the first flip-flop 10 into its set condition. The set input terminal S of the second flip-flop 11 becomes high, and the next sampling pulse 56 triggers the flip-flop 11 into its set condition. The set input terminal S of the third flip-flop 12 becomes high, the flip-flop 12 being triggered into its set condition by the following sampling pulse 57. The voltage level at the output terminal 14 is high corresponding to the level of the data input signal 35 during the second bit interval. As indicated in the waveforms 41, 42 and 43 of FIG. 2, the three flip-flops 10, 11 and 12 all assume their set conditions and remain in the set conditions until a further transition is detected in the level of the data input signal 35.

A further hit 37 is shown as occurring in the second bit interval. Since the level of the data input signal 35 is low at the time of the sampling pulse 58, causing the reset input terminal R of the first flip-flop 10 to be high, flip-flop 10 is triggered into its reset condition. The One output terminal of flip-flop 10 becomes low as shown in waveform 41. The level of the data input signal 35 having returned to its high level, the next sampling pulse 59 in the pulse train 39 triggers the first flip-flop 10 into its set condition. At the same time, the high voltage level at the Zero output terminal of the flip-flop 10 and, therefore, at the reset input terminal R of the second flip-flop 11 upon the occurrence of the sampling pulse 59 results in the second flip-flop 11 being triggered into its reset condition. The One output terminal of the second flip-flop 11 becomes low, waveform 42. Upon the occurrence of the pulse 60 in the pulse train 40 applied to the gate circuit 18 from the reference generator 27 following the sampling pulse 59 in the pulse train 39, the first flip-flop 10 is in its set condition, the second flip-flop 11 is in its reset condition, and the third flip-flop 12 is in its set condition. The input to the gate circuit 18 from the One output terminal of the first flip-flop 10 is high. The input to the gate circuit 18 from the Zero output terminal of the second flip-flop 11 is high, and the input to the gate circuit 18 from the One output terminal of the third flip-flop 12 is high.

The gate circuit 18 is responsive to this pattern of inputs at the time of a pulse in the pulse train 40 received from the reference generator 27 to produce an output pulse. The output pulse 61, waveform 62, is delayed by the delay 19 and applied to the trigger input terminal $T_S$ of the second flip-flop 11. The set input terminal S of the second flip-flop 11 is high due to the first flip-flop 10 having been triggered into its set condition by the previous sampling pulse 59. As shown in waveform 42, the second flip-flop 11 assumes its set condition. When the next sampling pulse 63 occurs in the pulse train 39, the first flip-flop 10 and the second flip-flop 11 are both in their set conditions. The third flip-flop 12 remains in its set condition. As shown in waveform 43, the output voltage level at the output terminal 14 remains high unaffected by the apperance of the hit 37 in the data input signal 35.

The operation will continue in the manner described. Each time the three flip-flops 10, 11 and 12 in the shift register assume the condition 010, the existence of a hit occurring at the time of a sampling pulse during a low level bit interval in the data input signal 35 is indicated. This pattern occurs only when interference in the form of the hit is present. Gate circuit 21 senses the existence of the pattern and by triggering the second flip-flop 11 to its other condition removes the pattern from the shift register. The data output signal is unaffected by the interference.

Upon the three flip-flops 10, 11 and 12 assuming the condition 101, the existence of a hit at the time of a sampling pulse during a high level bit interval in the data input signal is indicated. Gate circuit 18 is responsive only to this pattern to trigger the second flip-flop 11 to its other condition, again removing the pattern from the shift register. The interference is prevented from appearing in the data output signal. The interference detected in the data input signal 35 applied to input terminal 13 is filtered out, producing a data signal at the output terminal 14 identical to the input signal but free of the detected interference.

It is to be noted that when gate circuit 18 is responsive to the 101 pattern in the shift register to produce an output pulse, the inputs to the other gate circuit 21 from the three flip-flops 10, 11 and 12 are all low. The gate circuit 21 remains non-responsive. Likewise, when the gat circuit 21 is responsive to the pattern 010 in the shift register to produce an output pulse, the inputs to the gate circuit 18 from the flip-flops 10, 11 and 12 are all low. Gate circuit 18 remains non-responsive. Gates 18 and 21 provide logically complementary outputs.

The hit 38 present in the third bit interval of the data input signal 35 illustrates the operation when the interference occurs in the time period between following sampling pulses 64, 65 in the pulse train 39. At the time both of the sampling pulses 64 and 65 occur, the level of the data input signal is low and the reset input terminal R of the first flip-flop 10 is high. The first flip-flop 10 having assumed its reset condition at the beginning of the third bit interval, remains in its reset condition. The existence of the hit 38 is ignored, avoiding any transient change in the level of the data signal at the output terminal 14. A hit occurring during either a low level or a high level bit interval of the data input signal between adjacent sampling pulses produces no change in the status of the three flip-flops 10, 11, 12. Such interference is removed from the received data signal.

The operation when a transient change in the input data signal level occurs at the time of a sampling pulse or between adjacent sampling pulses has been described. It is also possible for either the leading edge or the trailing edge of the transient change in signal level to occur at the time of a sampling pulse. The resulting operation depends on the degree of coincidence between the sampling pulse and the edge of the transient change in signal level, as well as the response time of the first flip-flop 10. If the degree of coincidence is not sufficient to permit the formation of a trigger pulse of sufficient level to reverse the condition of the flip-flop 10, flip-flop 10 remains in its existing condition. The operation is the same as that which results when the hit or interference occurs between adjacent sampling pulses. The three flip-flops 10, 11, 12 are non-responsive to the interference, and the interference is removed from the received data signal. If, due to the fast response time of the flip-flop 10 or other factors, a trigger pulse is formed by the appearance of an edge of a hit at the time of a sampling pulse having a level sufficient to reverse the condition of the flip-flop 10, either the 101 or the 010 pattern is stored in the three flip-flops 10, 11 and 12 of the shift register according to whether the edge of the hit occurred during a low level or high level bit interval in the received data signal. One of the gate circuits 18 or 21 functions to detect the existence of the pattern and to remove the pattern from the shift register in the manner described above, preventing the appearance of the interference in the data signal derived from the One output terminal of the third flip-flop 12.

Based on the frequencies given above, all transient changes in the level of the data signal applied to input terminal 13 and having a duration of 0.1 millisecond or less are removed. While the frequency of the sampling pulses must be such that the spacing between sampling pulses is less than the bit interval in the data signal, the actual frequency of the sampling pulses can be varied according to the needs of the particular application. If, for example, the hits to be removed by the embodiment of the invention shown in FIG. 1 from the 1000 bit per second data signal 35 shown in FIG. 2 are found to be of a duration greater than 0.1 millisecond and less, the frequency of the sampling pulses is decreased a corresponding amount to again cause no more than one sampling pulse to occur at the time of a hit. On the other hand, if the hits to be removed are found to be of a duration smaller than 0.1 millisecond and less, the frequency of the sampling pulses can be increased by a corresponding amount with no more than one sampling pulse occurring during a hit. In either case, the resulting operation is similar to that described with the interference in the form of the hits being removed from the data signal.

Reference has been made to the occurrence of a single hit or transient change in signal level during a bit interval of the data signal. The operation is the same should two or more hits be spaced within a bit interval. The hits are removed from the data signal in the manner described.

While a rate of data transmission of 1000 bits per second has been given by way of example, the invention is not to be understood as limited for use in applications where this particular data rate is employed. The data signal may be of the type utilized in telegraphic communication systems where smaller transmission frequencies are customarily used. On the other hand, the data signal may be of the type utilized in high speed computer and telemetry equipments involving even higher transmission frequencies. The invention is suitable for use in a wide range of applications. The frequency of the sampling pulses is determined according to the given data rate so that the spacing between sampling pulses is less than the bit interval. Where it is desired to provide a minimum of component parts as in the embodiment of the invention shown in FIG. 1, the actual frequency of the sampling pulses is determined according to the duration of the interference to be removed so that no more than one sampling pulse occurs during an objectionable transient change in the data signal level.

The operation is as described regardless of the particular data rate involved. The shift register including the three flip-flops 10, 11 and 12 is operated to sample and store the received data signal at a rate determined by the interference to be removed. The gate circuits 18 and 21 examine the samples for patterns indicating the existence of the interference and function to remove the patterns from the shift register when they occur, thereby preventing the appearance of the interference in the data output signal.

Applications may arise where it is found that the only reference generator available for use is one providing a pulse train of a frequency higher than that needed for the operation of the invention. For example, assume again a 1000 bit per second data signal with hits of 0.1 millisecond duration and less to be removed. The only reference generator available is one supplying a pulse train having a frequency of 20,000 cycles per second or twice the 10,000 cycles per second pulse train referred to above in describing the embodiment of the invention shown in FIG. 1. Since the sampling pulse rate is doubled, it is possible for two of the sampling pulses to occur during a hit or transient change in the level of the data signal. Four samples of the received data signal are now stored in order to detect and correct hits extending over two of the sampling pulses.

In adapting the invention for use in such an application, a fourth flip-flop is added to the shift register in FIG. 1. The set and reset input terminals of the fourth flip-flop are connected to the One and Zero output terminals of the third flip-flop 12. The data signal output terminal is connected to the One output terminal of the fourth flip-flop. Four sample patterns are now possible which indicate the presence of a hit or interference in the data signal. If the hit is of a duration such that only one sampling pulse occurs during the hit, the first three flip-flops 10, 11 and 12 in the shift register assume either the 010 or the 101 pattern depending on the level of the data signal. The gate circuits 18 and 21 operate to detect the existence of the patterns and to remove the patterns from the shift register, thereby removing the interference from the data signal. The operation is identical to that described above.

When the hit is of a duration so that two sampling pulses occur at the time of the hit, the four flip-flops in the shift register will assume one of two patterns depending upon the level of the bit interval in the data signal during which the hit occurs. If the signal is at the low level during the bit interval, the four flip-flops assume the pattern 0110 indicating the occurrence of the hit. The first and fourth flip-flops are reset and the second and third flip-flops are set. When the hit occurs during a high level bit interval of the data signal, the four flip-flops assume the pattern 1001. The first and fourth flip-flops are set and the second and third flip-flops are reset. Additional gate circuits similar in construction and operation to the gate circuits 18 and 21 are connected to the flip-flops to detect the presence of the patterns 1001 and 0110 in the shift register and to remove the patterns from the shift register by the application of trigger pulses to the flip-flops. The operation in removing the interference from the data signal is similar to that described above in connection with FIG. 1.

A feature of the invention is the fact that it is highly versatile in nature, permitting it to be readily adapted for use in a wide range of practical applications.

What is claimed is:

1. A circuit for detecting and correcting distortion in a signal comprising, in combination,
means for sampling said signal at a rate determined by said distortion and for storing said samples,
means for examining said stored samples for a pattern which indicates the presence of said distortion in said signal and for removing said pattern of stored samples from said storage means when said pattern occurs,
and means for deriving said signal from said storage means free of said distortion.

2. A circuit for filtering a signal comprising, in combination,
means for sampling said signal at a constant rate and for storing said samples,
and means for examining said stored samples for given patterns and for removing said patterns of stored samples from said first-mentioned means whenever one of said patterns is detected so that said first-mentioned means is operated to filter said signal.

3. A digital filter comprising, in combination, first means responsive to a data signal for sampling said signal at a given rate and for storing said samples,
second means coupled to said first means for removing given patterns of said stored samples from said first-mentioned means whenever one of said patterns occurs,
said first means being operated by said second means to filter from said signal the conditions producing said patterns of stored samples,
and means for deriving said filtered signal from said first means.

4. In combination,
first means responsive to a distorted data signal for sampling said signal at a rate determined by said distortion and for storing said samples,
second means coupled to said first means for examining said stored samples for a pattern of said stored samples which indicated the presence of said distortion in said signal and for removing said pattern of stored samples from said first means when said pattern occurs,
said first means being operated by said second means to filter said distortion from said signal,
and means for deriving said filtered signal from said first means.

5. A circuit for detecting and correcting distortion in a data signal comprising, in combination,
means for examining said signal at intervals determined by said distortion for patterns indicating the presence of said distortion in said signal and for modifying said signal to remove the condition thereof producing said patterns,
whereby said distortion is removed from said signal.

6. A circuit for detecting and correcting distortion in a signal where said distortion is in the form of a transient change in the signal level,
said circuit comprising, in combination, first means for sampling said signal at a rate determined by the duration of said change and for storing said samples,
second means coupled to said first means for removing a pattern of said stored samples indicating the presence of said change in said signal from said first means whenever said pattern occurs,
whereby said first means is operated by said second means to produce an output signal corresponding to said first-mentioned signal but free of said transient change in the level thereof.

7. In combination,
input means connected to receive a data signal distorted by the presence of transient changes in the level of said signal during the bit intervals thereof,
second means coupled to said input means for sampling said signal at a rate determined by the duration of said changes and for storing said samples,
third means coupled to said second means for examining said stored samples for patterns of said stored samples which indicate the presence of said changes in said signal and for removing said patterns of stored samples from said second means when said patterns occur,
said second means being operated by said third means to filter said transient changes from said signal,
and output means coupled to said second means for deriving said filtered signal from said second means.

8. A circuit for detecting and correcting distortion in a data signal comprising, in combination,
a shift register,
means for operating said shift register to sample said signal at a rate determined by said distortion and to store said samples,
a gating means coupled to said shift register for examining said stored samples for a pattern which indicates the presence of said distortion in said signal and for removing said pattern of stored samples from said shift register when said pattern occurs,
said shift register being operated by said gating means to remove said distortion from said signal,
and means for deriving from said shift register said signal free of said distortion.

9. A circuit for detecting and correcting ditsortion in a data signal comprising, in combination,
a shift register having a plurality of output terminals,
means for operating said shift register at a rate determined by said distortion to produce at said output terminals samples of said signal,
a gating circuit having a plurality of input terminals connected to said output terminals,
means for operating said gating circuit at times between said signal sampling times to examine said samples at said output terminals for a pattern which indicates the presence of said distortion in said signal and to produce an output signal when said pattern occurs,
means coupled between said shift register and said gating circuit responsive to said output signal to operate said shift register so as to remove said pattern of samples from said shift register,
and means for deriving from one of said output terminals said signal free of said distortion.

10. A circuit for detecting and correcting distortion in a data signal where said distortion is in the form of a transient change in the signal level occurring during a bit interval of said signal,
said circuit comprising, in combination,
a shift register having a plurality of output terminals,
means including a source of a first pulse train for operating said shift register at a rate determined by the duration of said change to produce at said output terminals samples of said signal,
a gating circuit having a plurality of input terminals connected to said output terminals,
means including a source of a second pulse train for operating said gating circuit at times between said signal sampling times to examine said samples at said output terminals for a pattern which indicates the presence of said change in the level of said signal and to produce an output signal when said pattern occurs,
means coupled between shift register and said gating circuit responsive to said output signal to operate said shift register in a manner which removes said pattern of samples from said output terminals,
and means for deriving from one of said output terminals said signal free of said distortion.

11. A digital filter comprising, in combination,
input means adapted to receive a distorted data signal,
a shift register including a plurality of flip-flops each capable of assuming either one of two stable states,
means for operating said shift register to sample said signal at a rate determined by said distortion and to store said samples in the states assumed by said flip-flops,
a gating circuit connected to said flip-flops and operated at times between said signal sampling times to examine the states of said flip-flops for a pattern which indicates the presence of said distortion in said signal and to produce and output signal when said pattern occurs,
means responsive to said output signal for operating said shift register in a manner which removes said pattern from said shift register,
and means for deriving from said shift register said signal free of said distortion.

12. In combination,
input means adapted to receive a data signal distorted by the occurrence of a transient change in the level of said signal during a bit interval, a shift register including a plurality of flip-flops each capable of assuming either of two stable states,
means for operating said shift register to sample said signal at a rate determined by the duration of said change and to store said samples by the states assumed by said flip-flops,
means for examining the states of said flip-flops at times between said signal sampling times for a pattern in said shift register which indicates the presence of said change in said signal and to produce an output pulse when said pattern occurs,
means responsive to said output pulse to alter the existing states of said flip-flops in a manner which removes said pattern from said shift register,
and means for deriving said signal free of said change from the last one of said flip-flops in said shift register.

13. In combination,
input means adapted to receive a data signal distorted by the occurrence of a transient change in the level of said signal during a bit interval,
a shift register including a plurality of flip-flops each capable of assuming either of two stable states,
a source of a first pulse train having a frequency determined by the duration of said change and the data transmission rate of said signal,
means connecting said shift register to said input means and said source so as to operate said shift register in response to said first pulse train to sample said signal at the rate of the pulses in said pulse train and to store said samples by the states assumed by said flip-flops,
a second source of a second pulse train of the same frequency as said first pulse train with the pulses in said second pulse train occurring in time midway between the pulses in said first pulse train,
a gating circuit,
means connecting said gating circuit to said flip-flops and to said second source so as to operate said gating circuit at times between said signal sampling times to examine the states of said flip-flops for a pattern in said shift register which indicates the presence of said change in said signal and to produce an output pulse when said pattern occurs,
means responsive to said output pulse to alter the existing states of said flip-flops in a manner to remove said pattern from said shift register,
and means for deriving said signal free of said change from the last one of said flip-flops in said shift register.

14. A combination as claimed in claim 13, and wherein,
the frequency of said first pulse train is determined so that it is possible for only one pulse of said pulse train to occur in time during said transient change in the level of said signal.

15. A digital filter for data signals comprising, in combination,
input means adapted to receive a data signal distorted by a transient change in the level of said signal,
first, second and third flip-flops each capable of assuming either of two stable states,
means connecting said flip-flops together to form a shift register,
means to apply said signal from said input means to the first of said flip-flops in said shift register,
means for operating said shift register to sample said signal at a rate determined by the duration of said change and to store said samples by the states assumed by said flip-flops,
a gating circuit,
means connecting said gating circuit to said flip-flops and for operating said gating circuit at times between said signal sampling times to examine the states of said flip-flops for a pattern in said shift register which indicates the presence of said change in said signal and to produce an output signal when said pattern occurs, means responsive to said output signal to place the middle one of said flip-flops in said shift register in its state opposite to that existing at the time of said output signal so that said pattern is removed from said shift register, and means for deriving said signal free of said change from the last of said flip-flops in said shift register.

References Cited by the Examiner

UNITED STATES PATENTS

| | | | |
|---|---|---|---|
| 3,047,806 | 7/1962 | Heslop | 328—7 |
| 3,129,286 | 4/1964 | Levick | 328—162 X |
| 3,225,213 | 12/1965 | Hinrichs | 328—162 X |
| 3,234,472 | 2/1966 | Ebeling et al. | 328—163 X |

ARTHUR GAUSS, *Primary Examiner.*

J. HEYMAN, *Assistant Examiner.*